United States Patent
Sahota et al.

(10) Patent No.: US 6,503,418 B2
(45) Date of Patent: *Jan. 7, 2003

(54) TA BARRIER SLURRY CONTAINING AN ORGANIC ADDITIVE

(75) Inventors: Kashmir S. Sahota, Fremont, CA (US); Diana M. Schonauer, San Jose, CA (US); Steven C. Avanzino, Cupertino, CA (US)

(73) Assignee: Advanced Micro Devices, Inc., Sunnyvale, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/434,146

(22) Filed: Nov. 4, 1999

(65) Prior Publication Data

US 2002/0005504 A1 Jan. 17, 2002

(51) Int. Cl.[7] .................. C09K 13/00; C09K 13/06; H01L 21/302
(52) U.S. Cl. .............. 252/79.1; 252/79.4; 438/692
(58) Field of Search .................. 438/692; 252/79.4, 252/79.1

(56) References Cited

U.S. PATENT DOCUMENTS

| | | | | |
|---|---|---|---|---|
| 5,302,368 A | * | 4/1994 | Harato et al. | 423/625 |
| 5,314,843 A | * | 5/1994 | Yu et al. | 438/692 |
| 5,395,801 A | * | 3/1995 | Doan et al. | 438/692 |
| 5,645,736 A | * | 7/1997 | Allman | 216/89 |
| 5,770,095 A | | 6/1998 | Sasaki et al. | 216/38 |
| 5,783,489 A | * | 7/1998 | Kaufman et al. | 438/692 |
| 5,824,599 A | * | 10/1998 | Schacham-Diamond et al. | 438/678 |
| 5,840,629 A | * | 11/1998 | Carpio | 438/692 |
| 5,897,375 A | | 4/1999 | Watts et al. | 438/693 |

\* cited by examiner

Primary Examiner—Benjamin L. Utech
Assistant Examiner—Lynette T. Umez-Eronini
(74) Attorney, Agent, or Firm—Deborah Wenocur; Gerald Fisher

(57) ABSTRACT

A Ta barrier slurry for Chemical-Mechanical Polishing (CMP) during copper metallization contains an organic additive which suppresses formation of precipitates and copper staining. The organic additive is chosen from a class of compounds which form multiple strong adsorbant bonds to the surface of silica or copper, which provide a high degree of surface coverage onto the reactive species, thereby occupying potential reaction sites, and which are sized to sterically hinder the collisions between two reactant molecules which result in new bond formation

51 Claims, 12 Drawing Sheets

TA BARRIER SLURRY CONTAINING AN ORGANIC ADDITIVE

FIELD OF THE INVENTION

This invention relates to the manufacture of integrated circuits, and in particular to slurries used for Chemical-Mechanical-Polishing of metal structures used in copper metallization.

BACKGROUND OF THE INVENTION

As integrated circuit devices shrink, with semiconductor device geometries approaching 0.18 micron minimum feature size, and as circuit speed and performance increase, copper has replaced aluminum as the preferred electrical interconnect material. The use of copper as an interconnect material in silicon integrated circuits has occurred in response to the need for lowered interconnect resistivity, good electromigration resistance, and good deposition characteristics which allow effective filling of vias and contacts.

Copper metallization structures are often formed by a process known as Damascene, which is illustrated in FIG. 1. An insulating layer known as the Interlevel Dielectric (ILD) separates metal layers in a multilevel metallization structure. ILD dielectric layer 2, which may be comprised of a bottom layer 4 and a top, low dielectric constant layer 6, has regions 8 etched therein into which the metal lines will be inlaid. A barrier layer 10 is deposited, which serves to prevent diffusion of copper from the metal lines into the dielectric. This barrier layer is generally comprised of Ta or Ta compounds. A copper seed layer is then generally deposited, followed by an electroplated copper layer 14. The excess copper is then removed by a process known as Chemical Mechanical Polishing (CMP). CMP enhances the removal of surface material over large distances and short distances by simultaneously abrading the surface while a chemical etchant selectively attacks the surface. For this purpose, CMP utilizes a polishing slurry containing both an abrasive and a chemically active component.

Typically, in copper Damascene processing, the CMP is performed in two steps. The first CMP step removes the excess copper from the wafer surface, and may also remove part or all of the underlying barrier layer 10. A second CMP step is then generally performed, with the objectives of 1) completely removing the conductive Ta layer from the dielectric surface between Cu lines, and 2) planarizing the surface to compensate for Cu dishing and erosion, illustrated in FIG. 2. To accomplish the second objective, the second CMP step must have a selectively higher polish rate of $SiO_2$ than of Cu, thereby compensating for Cu dishing during over-polish.

Of equal importance to these structural objectives is the quality of the polished surfaces, both Cu and $SiO_2$, with respect to both surface damage/roughness and foreign materials on the surface. Post CMP cleaning can only address removable solid materials and ionic contamination.

The preferred abrasive used in slurries for Ta barrier polishing is silica, although other abrasives such as alumina have been used. The advantages to using silica abrasive in place of the alumina abrasive commonly used in other CMP applications include: 1) increased Ta removal rate, 2) greater ability to polish the oxide dielectric film for planarization, and 3) the potential for minimizing damage to the oxide and Cu surfaces. All of these advantages result from the high chemical reactivity of silica, resulting in a higher ratio of chemical to mechanical component of the polish than would occur using alumina abrasive. The hydrolysis of Si—O—Si bonds to Si—OH HO—Si, and the reverse chemical process, namely, condensation of Si—OH HO—Si to Si—O—Si+ $H_2O$, form the basis of much of the well documented chemistry of silica, as described by R. K. Iler in *The Chemistry of Silica*, Wiley-Interscience, New York, 1979. However, this high chemical reactivity poses difficult challenges in preventing unwanted reactions involving silica from occurring on the wafer surface.

A typical silica abrasive slurry used for Ta barrier polishing comprises 50–300 nm diameter silica particles suspended in an aqueous medium. To avoid the problem of copper corrosion during and after polish, copper corrosion inhibiting compounds such as benzotriazole or 1,2,4-triazole, are typically dissolved in the slurry medium, and the pH of the suspension is adjusted to a value between pH7 and pH10.5, which is the range empirically found to produce the lowest corrosion rates. Byproducts of the polishing process result in the slurry medium containing dissolved silica, dissolved copper, and dissolved tantalum, in addition to the formulating slurry ingredients.

In the prior art, two types of solid defects have been seen after CMP of copper features using silica slurries, and also after CMP of copper features using alumina slurries when $SiO_2$ was present. These defects include precipitates and copper stains. The use of corrosion inhibiting triazole compounds in the slurry has been found to greatly amplify the occurrence of these defects. The precipitated residues, which are comprised in part of conducting materials, adversely affect device yield and reliability, for example by causing shorting and/or line-to-line leakage. Residues and precipitates additionally prevent the dielectric barrier from effectively sealing the top surface of the copper line, resulting in copper diffusion into the dielectric as well as providing a surface electromigration path for copper atoms.

SUMMARY OF THE INVENTION

It is therefore an object of this invention to provide an improved CMP slurry for the polishing of Ta barrier layers in copper metallization during integrated circuit processing which yields a lowered incidence of silica precipitates and copper stains.

It is a further object of this invention to provide a CMP slurry for the polishing of Ta barrier layers in copper metallization during integrated circuit processing which includes corrosion-inhibiting triazole compounds, which further includes silica abrasive, and which yields a lowered incidence of silica precipitates and copper stains.

It is a further object of this invention to provide a CMP slurry for the polishing of Ta barrier layers in copper metallization during integrated circuit processing which inhibits chemical reactions between silica, triazole, and copper.

Our invention meets these objects by providing a CMP slurry for the polishing of Ta barrier layers underlying copper metallization which includes at least one additional slurry component which inhibits silica-triazole-copper reactions. A set of chemical compounds has been successfully used in a CMP slurry to inhibit said reactions, including organic compounds which form hydrogen bonds to the surface of polymeric silica molecules with a high degree of surface coverage, and which also adsorb onto copper hydroxo species.

DETAILED DESCRIPTION OF THE INVENTION

The chemical literature describes the tendency of silica to form strong chemical bonds to the polybasic metal ions of such elements as copper and tantalum. Solutions of copper salts are known to coagulate or co-precipitate with silica at pH values greater than 5. Furthermore, the chemically-oxidized copper surfaces that remain after CMP provide ready nucleation sites for precipitation reactions to occur.

Figure 1:
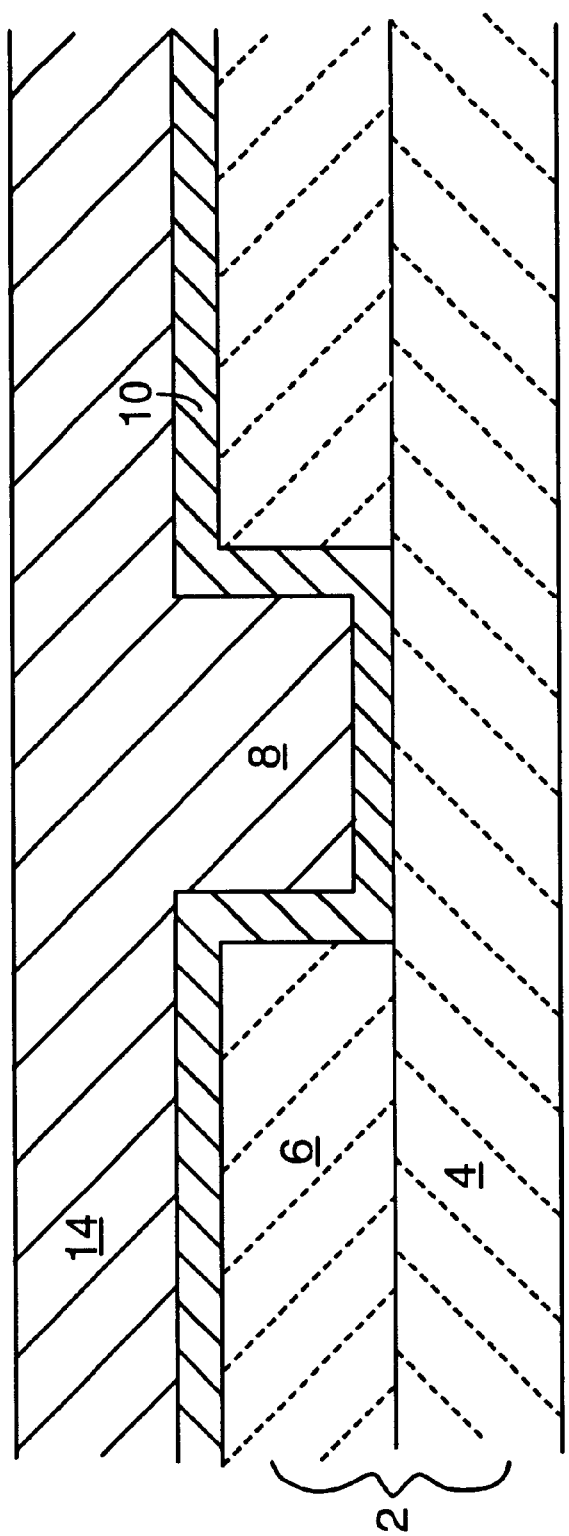
FIG. 1 illustrates a typical Damascene structure used in copper metallization systems.
Figure 2:
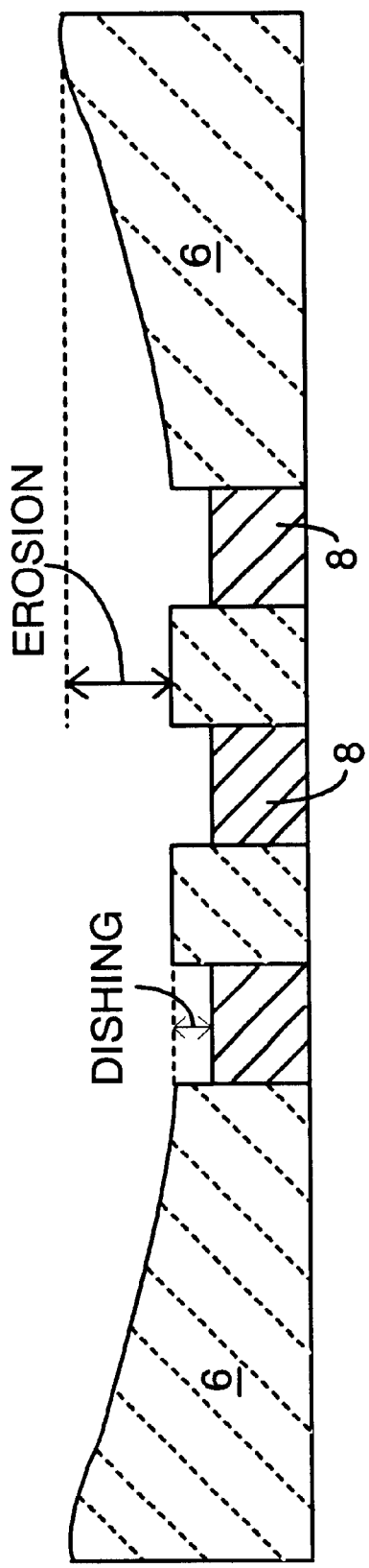
FIG. 2 illustrates the dishing effect seen after copper CMP.
Figure 3:
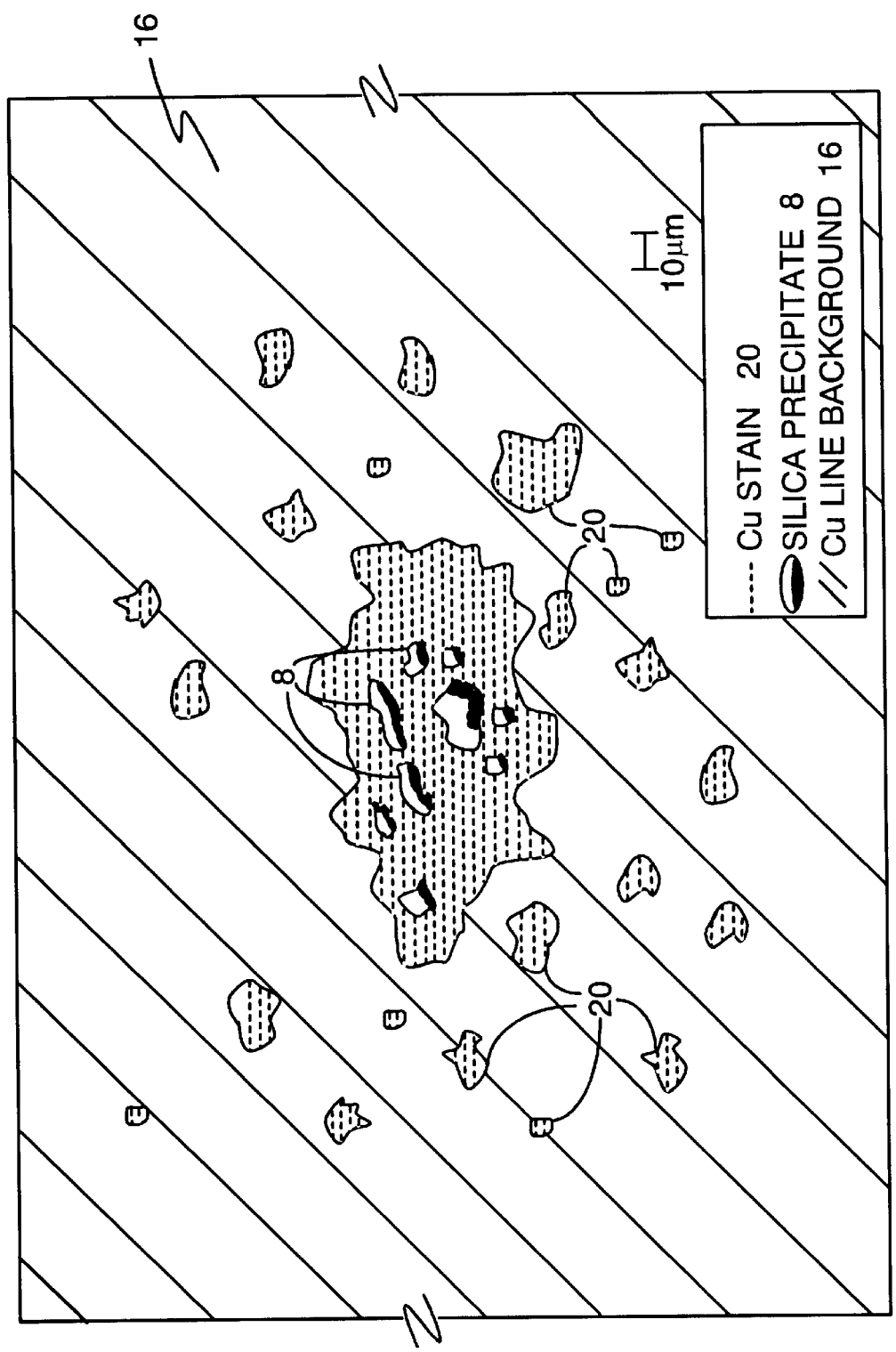
FIG. 3 is a drawing representing an SEM photograph showing silica precipitates and copper staining following CMP of Ta barrier layer during Damascene processing.

The precipitated residues detected after CMP using a triazole-containing slurry comprise silica/copper hydroxide/triazole, hereinafter referred to as "silica precipitates", and copper/triazole, hereinafter referred to as "copper stains". FIG. 3 is a drawing representing an SEM picture of copper lines 16 after Ta CMP, showing silica precipitates 18 and copper stains 20. These residues are chemically grown on the surfaces, and they are not readily removed during post-CMP cleaning.

Our invention provides for a re-engineering of the Ta slurry chemistry by inclusion of an additional slurry component, in order to suppress the chemical reactions between triazole, silica, and copper, which cause the formation of silica precipitates, and copper stains. Inhibiting the chemical reaction between silica and copper, or between either or both of the two and triazole, has been achieved by adding one of a set of chemical species, each of said species exhibiting several characteristics. A first characteristic is that the chemical species strongly adsorbs onto the surface of silica and/or copper hydroxide. A second characteristic of the adsorbing chemical species is the ability to provide a high degree of surface coverage onto the reactive species, thereby occupying potential reaction sites. A third characteristic which affects the degree of inhibition of the silica/copper reaction is the size of the adsorbing molecules. An optimally sized adsorbant will sterically hinder the collisions between two reactant molecules which result in new bond formation.

The additives described hereinafter will be analyzed primarily according to their interaction with the silica surface, which is comprised of silicon atoms bonded either to neutral oxygen atoms, negatively charged O— species, or to OH (hydroxyl) groups. The silica may be silica slurry particles, or it may be dissolved silica byproducts from CMP. Since it has been determined that copper stains contain copper but do not contain silica, in order to inhibit copper staining the additives must also form similar bonds to the copper surface or to copper ions in solution. The oxidized copper surface contains a combination of species including copper atoms bonding to neutral oxygen atoms or OH groups. Additionally, aqueous copper ions in solution can have hydroxyl groups replacing one or more of the water molecules bonding to the copper ions. Due to the similar configurations and bonding of surface oxygen and OH on the copper and silica surfaces, additives which adsorb onto the silica surface according to the aforementioned characteristics should exhibit like bonding behavior on the copper surface and/or the copper ions in solution.

Hydrogen bonding additives

A category of chemical species which exhibits some or all of the above three characteristics comprises organic chemical substances which form multiple hydrogen bonds to the surfaces of polymeric silica molecules and of copper (hydroxo) species.

If a hydrogen atom is bonded to a very electronegative atom such as oxygen, nitrogen, or fluorine, it is capable of forming another weak bond with another electronegative atom which has a pair of nonbonded electrons. This interaction, called the hydrogen bond, is a chemical bond which is weaker than covalent or ionic bonds because the dissociation energy of a hydrogen bond is only about 7 kcal/mole. However, the hydrogen bond is much stronger than the ordinary van der Waals bonds between molecules.

We have shown that several chemical species from the aforementioned category of organic chemical substances which form multiple hydrogen bonds to the surfaces of polymeric silica molecules and/or of copper(hydroxo) species can be successfully used in slurries for Ta barrier layer CMP to suppress the formation of silica precipitates and copper stains. These chemical species comprise:

1. poly(vinyl alcohol), 98% hydrolyzed
2. polyacrylamide
3. poly(ethylene glycol)
4. dimethylsiloxane-ethylene oxide co-polymer
5. glycerol propoxylate The chemistry and testing of each of these species will be addressed separately.

1. Poly(vinyl alcohol), 98% hydrolyzed

Figure 4A:
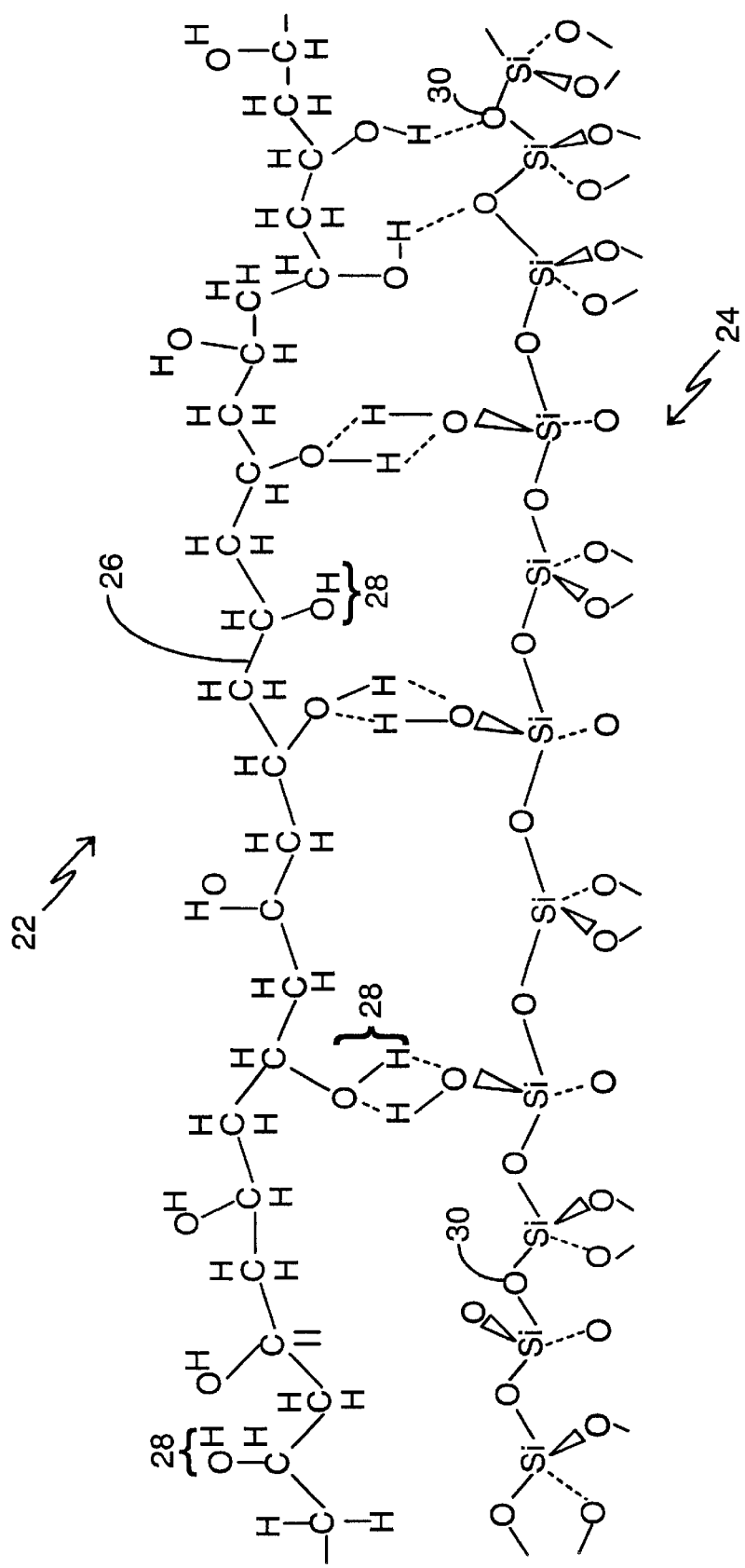
FIG. 4a is a drawing believed to show the bonding configuration between a PVA molecule and the silica surface.

This compound has been tested in a form having molecular weight of 13,000–23,000, with an average molecular weight of 18,000. The abbreviation for this compound is designated as PVA-18000. Its chemical structure is [—CH$_2$CH(OH)—]$_{400}$. FIG. 4a illustrates what is believed to be the bonding configuration between the PVA molecule 22 and the silica surface 24. The CH$_2$—CH bonds which form the backbone 26 of the alcohol molecule are tetrahedral rather than linear, yielding a long string-like structure which wraps repeatedly, forming into a quasi-spherical structure. The large number of protruding hydroxyl (OH) groups 28 form multiple hydrogen bonds with the surface oxygen atoms 30 on the silica particles. A large multiply-bonded complex is thereby formed which will not be likely to detach.

Four different Ta barrier slurry formulations containing PVA-18000 have been tested. Each one includes a silica abrasive herein after calld 'Suspension A'. Suspension A is an aqueous suspension of silica containing 13+/−0.5 wt % silica, $H_2O$, and containing a trace of KOH to adjust the pH to 10.3. The silica particle size distribution has a mean value of 204 nm with a standard deviation of 63 nm on a volume-averaged basis. Suspension A is available from Cabot Corporatioin as Cabot SC113. Two of the slurry formulations also include a small amount of sodium dodecylbenzenesulfonate (NaDBS), an anionic surfactant which has been claimed in the literature to enhance the adsorption of PVA onto silica. In all of the slurry formations described hereinafter, the weight percentages of compounds other than Suspension A (Cabot SC113) are noted, and the remainder of the slurry is comprised of the Cabot SC113.

The control slurry as described below is the same for all tested additives.

The tested slurry formulations are as follows:

Slurry F:
  Cabot SC113
  1,2,4-triazole (1.54 wt %)
  PVA-18000 (0.11 wt %)
  $H_2O$ (4.35 wt %)
Slurry G:
  Cabot SC113
  1,2,4-triazole (1.54 wt %)
  PVA-18000 (0.55 wt %)
  $H_2O$ (4.33 wt %)
Slurry 1a:
  Cabot SC113
  1,2,4-triazole (1.54 wt %)
  PVA-18000 (0.22 wt %)
  sodium dodecylbenzenesulfonate (0.05 wt %)
  $H_2O$ (4.34 wt %)
Slurry 1b:
  Cabot SC113
  1,2,4-triazole (1.54 wt %)
  PVA-18000 (0.55 wt %)
  sodium dodecylbenzenesulfonate (0.13 wt %)
  $H_2O$ (4.33 wt %)
Control slurry:
  Cabot SC113
  1,2,4-triazole (1.54 wt %)
  $H_2O$ (4.36 wt %)

The pH of each of these slurries, including the control slurry, is 8.9±0.1. All of the above compositions result in colloidal suspensions which are stable with respect to silica particle size distribution over a time period greater than two months.

Using a standardized Cu Damascene process, all of the above slurries have been evaluated for 1) their polishing rates of unpatterned Cu, Ta, and $SiO_2$ films, 2) the degree of Cu line dishing and Cu pattern erosion that results when used as a second step Ta polish, and 3) the tendency of the slurry to produce precipitate residues on Cu features. The results for these and all the other slurries tested are summarized in Table 1 at the end of the specification. No silica precipitate or copper stain residues are discernable using visual (optical microscope) and SEM inspection at any wafer locations for slurries F, G, 1a, or 1b. In comparison, the control Ta barrier slurry results in heavy silica precipitate and stain residues located across the entire wafer. The same control Ta barrier slurry is used in all experiments described hereinafter.

PVA exists with average molecular weight ranging between approximately 9000 and 186,000, and also exists in co-polymer form with both poly (vinyl acetate) and polyethylene. It is believed that these other forms of PVA will also act as precipitate inhibitors. It is believed that PVA or other polymeric alcohols with molecular weight equal to or greater than 18,000 are the most effective, but that a molecular weight of greater than 10,000 is acceptable. Concentrations of 0.1 wt % or greater are believed to be effective, possibly as low as 0.01 wt %.

Lower molecular weight alcohols and sugars are also appropriate candidates for suppressing silica precipitation and copper stains. A Ta slurry formulation using a lower molecular weight sugar, sorbital, has been tested. Sorbitol has the chemical structure

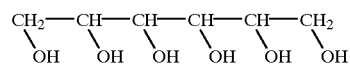

which allows hydrogen bonding to silica through the hydroxyl groups.

The tested slurry formulation is as follows:
Slurry 4b:
  Cabot SC113
  1,2,4-triazole (1.54 wt %)
  sorbitol (1.00 wt %)
  $H_2O$ (4.31 wt %)

The results from this slurry are summarized in Table 1. The addition of sorbitol was effective in reducing the degree of silica precipitation and copper stain found on the wafer relative to the control Ta slurry. However, some precipitation residues do remain, so that the use of sorbitol is judged to be not as effective as PVA-18000 in precipitate prevention. Many other low molecular weight, hydroxyl-containing compounds, glycerol by way of example, are believed to exhibit some degree of precipitate suppression.

2. Polyacrylamide

Figure 4B:
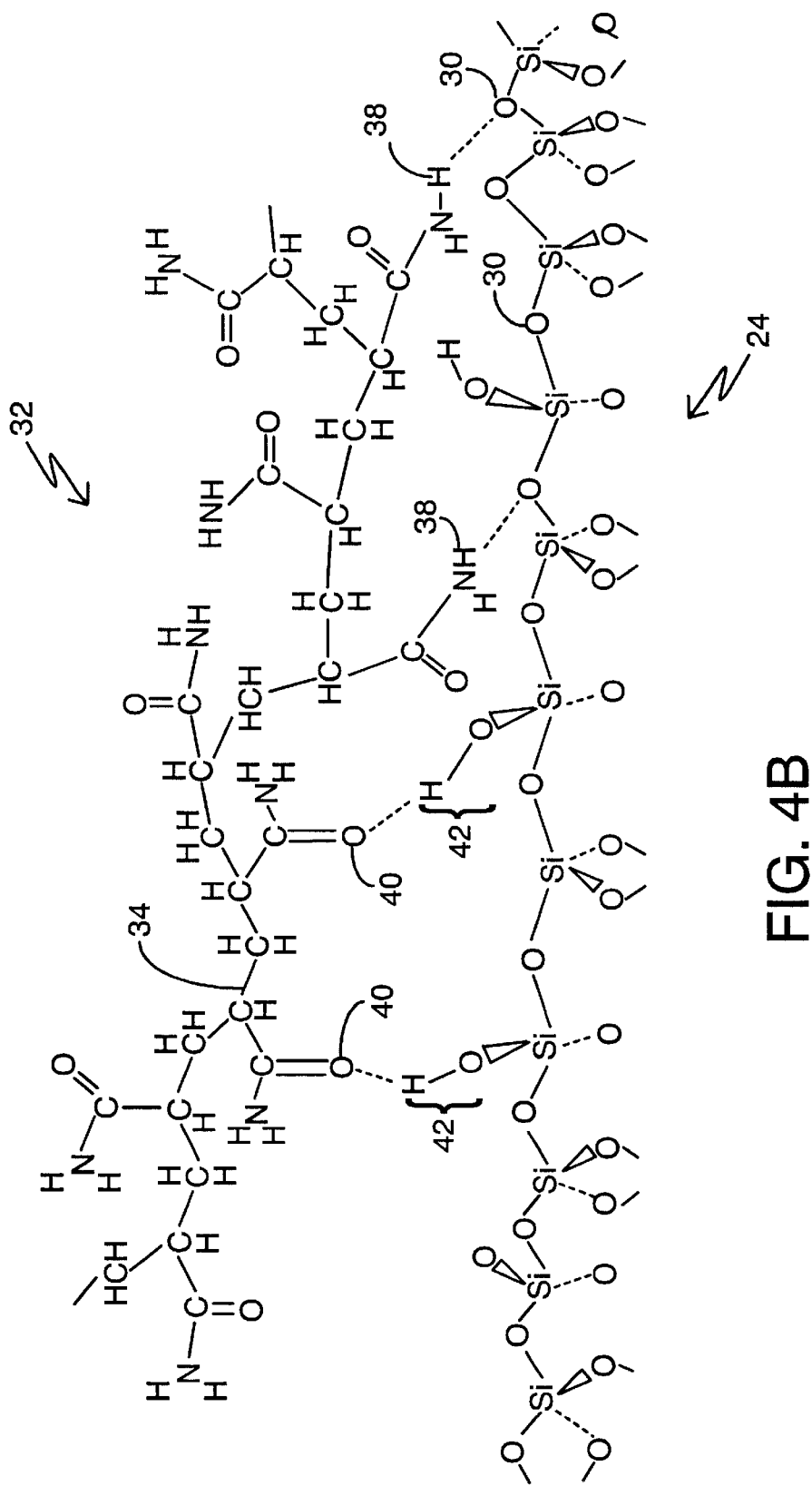
FIG. 4b is a drawing believed to show the bonding configuration between a PAA molecule and the silica surface.

This compound has been tested in a first form having an average molecular weight of 10,000, and a second form having an average molecular weight of 1500. The abbreviations for these compounds are designated as PAA-10000 and PAA-1500 respectively. Their chemical structures are $[-CH_2CH(CONH_2)-]_{~141}$ and $[-CH_2CH(CONH_2)-]_{~21}$ respectively. FIG. 4b illustrates what is believed to be the bonding configuration between the PAA molecule 32 and the silica surface 24. The $CH_2-CH$ bonds which form the backbone 34 of the PAA molecule are tetrahedral rather than linear, yielding a long string-like structure which wraps repeatedly, forming into a quasi-spherical structure. The PAA molecules can hydrogen bond to silica through the amide functional groups 36 in one of two modes: 1) through its amido hydrogens 38 to bridging oxygen atoms 30 on silica surface 24, or 2) through its carbonyl oxygens 40 to silanol sites 42 on silica surface 24. Multiple hydrogen bonds are formed, and a large multiply-bonded complex is thereby formed which will not be likely to detach.

Four different Ta slurry formulations containing PAA-10000 and PAA-1500 have been tested.

The tested slurry formulations are as follows:
Slurry 12a:
  Cabot SC113
  1,2,4-triazole (1.54 wt %)
  PAA-10000 (0.10 wt %)
  $H_2O$ (4.45 wt %)

Slurry 12b:
  Cabot SC113
  1,2,4-triazole (1.54 wt %)
  PAA-10000 (1.00 wt %)
  H$_2$O (5.25 wt %)
Slurry D:
  Cabot SC113
  1,2,4-triazole (1.54 wt %)
  PAA-1500 (0.10 wt %)
  H$_2$O (4.45 wt %)
Slurry E:
  Cabot SC113
  1,2,4-triazole (1.54 wt %)
  PAA-1500 (1.00 wt %)
  H$_2$O (5.25 wt %)

The pH of each of these slurries is 8.9±0.1 All of the above compositions result in colloidal suspensions which are stable with respect to silica size distribution over more than two months time. Using a standardized Cu Damascene process, all of the above slurries have been evaluated for 1) their polishing rates of unpatterned Cu, Ta, and SiO$_2$ films, 2) the degree of Cu line dishing and Cu pattern erosion that results when used as a second step Ta polish, and 3) the tendency of the slurry to produce precipitate residues on Cu features. The results are summarized in Table 1. No silica precipitate or copper stain residues are discernable using visual and SEM inspection at any wafer locations for slurry 12b. The wafers polished with slurries 12a, D, and E exhibit a moderate degree of silica precipitate and stain, although less than present on the wafers using the control slurry. This result indicates that both concentration of polymer in the slurry and the weight or size of the polymer molecule are important factors in suppressing precipitate residues when using polyacrylamide. It is believed that molecular weight greater than or equal to 1500 with concentration of 0.1 wt % or greater will be effective when using polyacrylamide as a precipitate/residue suppressant.

3. Poly(ethylene glycol)

Figure 4C:
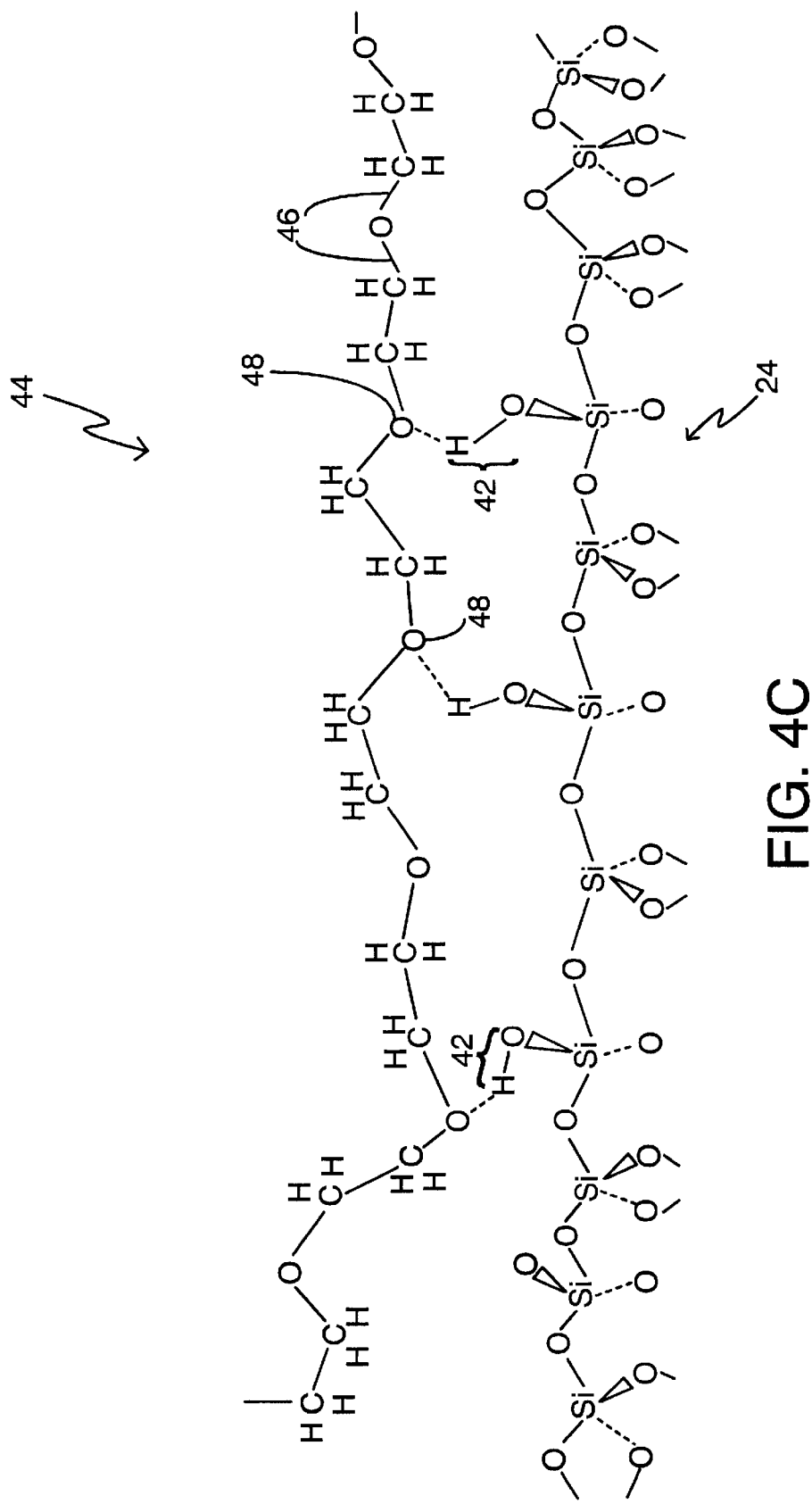
FIG. 4c is a drawing believed to show the bonding configuration between a PEG molecule and the silica surface.

This compound has been tested in a first form having an average molecular weight of 10,000, a second form having an average molecular weight of 1000, and a third form having an average molecular weight of 200. The abbreviations for these compounds are designated as PEG-10000, PEG-1000, and PEG-200 respectively. Their chemical structures are H(OCH$_2$CH$_2$)$_{~227}$OH, H(OCH$_2$CH$_2$)$_{~22}$OH, and H(OCH$_2$CH$_2$)$_{~4}$OH respectively. FIG. 4c illustrates what is believed to be the bonding configuration between the PEG molecule 44 and the silica surface 24. The O—CH$_2$—CH$_2$ bonds which form the backbone 46 of the PEG molecule are tetrahedral rather than linear, yielding a long string-like structure which wraps repeatedly, forming into a quasi-spherical structure The PEG molecules hydrogen bond to silica through ether oxygens 48 to silanol sites 42 on silica surface 24. Multiple hydrogen bonds are formed, and a large multiply-bonded complex is thereby formed which will not be likely to detach.

Six different Ta barrier slurry formulations containing PEG-10000, PEG-1000, and PEG-200 have been tested.

The tested slurry formulations are as follows:
Slurry 11a:
  Cabot SC113
  1,2,4-triazole (1.54 wt %)
  PEG-10000 (0.10 wt %)
  H$_2$O (4.35 wt %)
Slurry 11b:
  Cabot SC113
  1,2,4-triazole (1.54 wt %) PEG-10000 (1.00 wt %)
  H$_2$O (4.31 wt %)
Slurry 2b:
  Cabot SC113
  1,2,4-triazole (1.54 wt %)
  PEG-1000 (0.10 wt %)
  H$_2$O (4.35 wt %)
Slurry 2d:
  Cabot SC113
  1,2,4-triazole (1.54 wt %)
  PEG-1000 (1.00 wt %)
  H$_2$O (4.31 wt %)
Slurry 2a:
  Cabot SC113
  1,2,4-triazole (1.54 wt %)
  PEG-200 (0.10 wt %)
  H$_2$O (4.35 wt %)
Slurry 2c:
  Cabot SC113
  1,2,4-triazole (1.54 wt %)
  PEG-200 (1.00 wt %)
  H$_2$O (4.31 wt %)

The pH of each of these slurries is 8.9±0.1 All of the above compositions result in colloidal suspensions which are stable with respect to silica size distribution over greater than two months time.

Using a standardized Cu Damascene process, all of the above slurries have been evaluated for 1) their polishing rates of unpatterned Cu, Ta, and SiO$_2$ films, 2) the degree of Cu line dishing and Cu pattern erosion that results when used as a second step Ta polish, and 3) the tendency of the slurry to produce precipitate residues on Cu features. The results are summarized in Table 1. No silica precipitate or copper stain residues are discernable using visual or SEM inspection at any wafer locations for slurry 11b. Slurry 11a has produced equally good results except for a statistical anomaly at one site on one wafer only. The wafers polished with slurries 2a, 2b, and 2d exhibit a minor degree of silica precipitate and stain, although much less than present on the wafers using the control slurry. The wafer polished with slurry 2c exhibits a moderate degree of silica precipitate and stain, although less than present on the control. These results indicate that PEG should be effective as a residue/precipitate inhibitor for molecular weights above 200 and for concentrations above 0.1 wt %.

Four additional Ta barrier slurry formulations containing compounds closely related to poly(ethylene glycol), namely structural isomers of poly(ethylene glycol) or low molecular weight ethylene glycol ether compounds, have been tested. Slurry 6c and slurry 6d have been formulated using glycerol ethoxylate Mn 1000, a structural isomer to PEG-1000, with a designated abbreviation of GEO-1000. The compound has the molecular structure

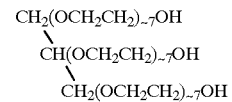

Figure 4D:
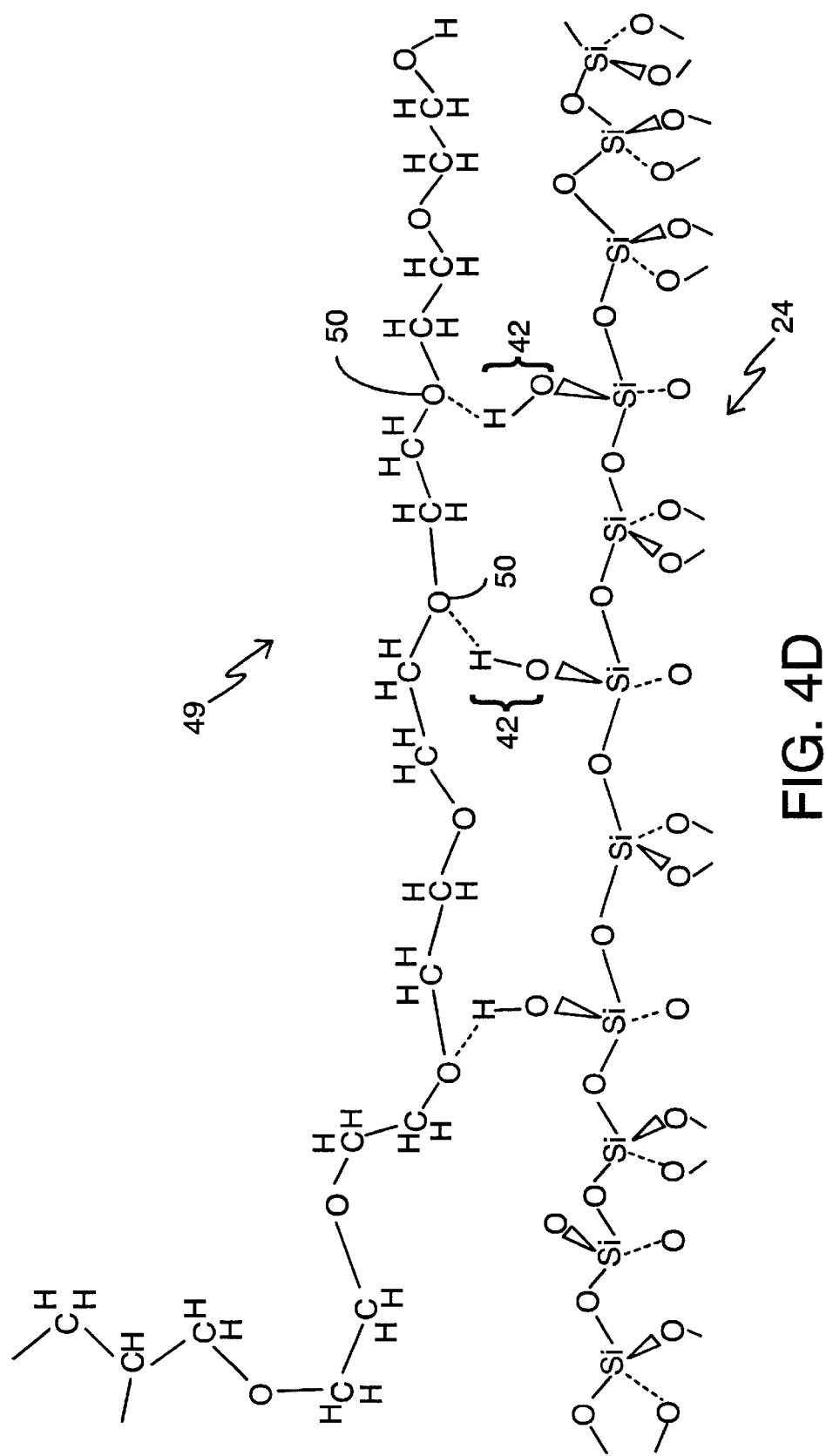
FIG. 4d is a drawing believed to show the bonding configuration between a GEO molecule and the silica surface.

FIG. 4d illustrates what is believed to be the bonding configuration between the GEO molecule 49 and the silica surface 24. The GEO molecule bonds to the silica surface similarly to the PEG molecule, with the GEO ether oxygens 50 forming hydrogen bonds to silanol sites 42 on silica surface 24.

Figure 4E:
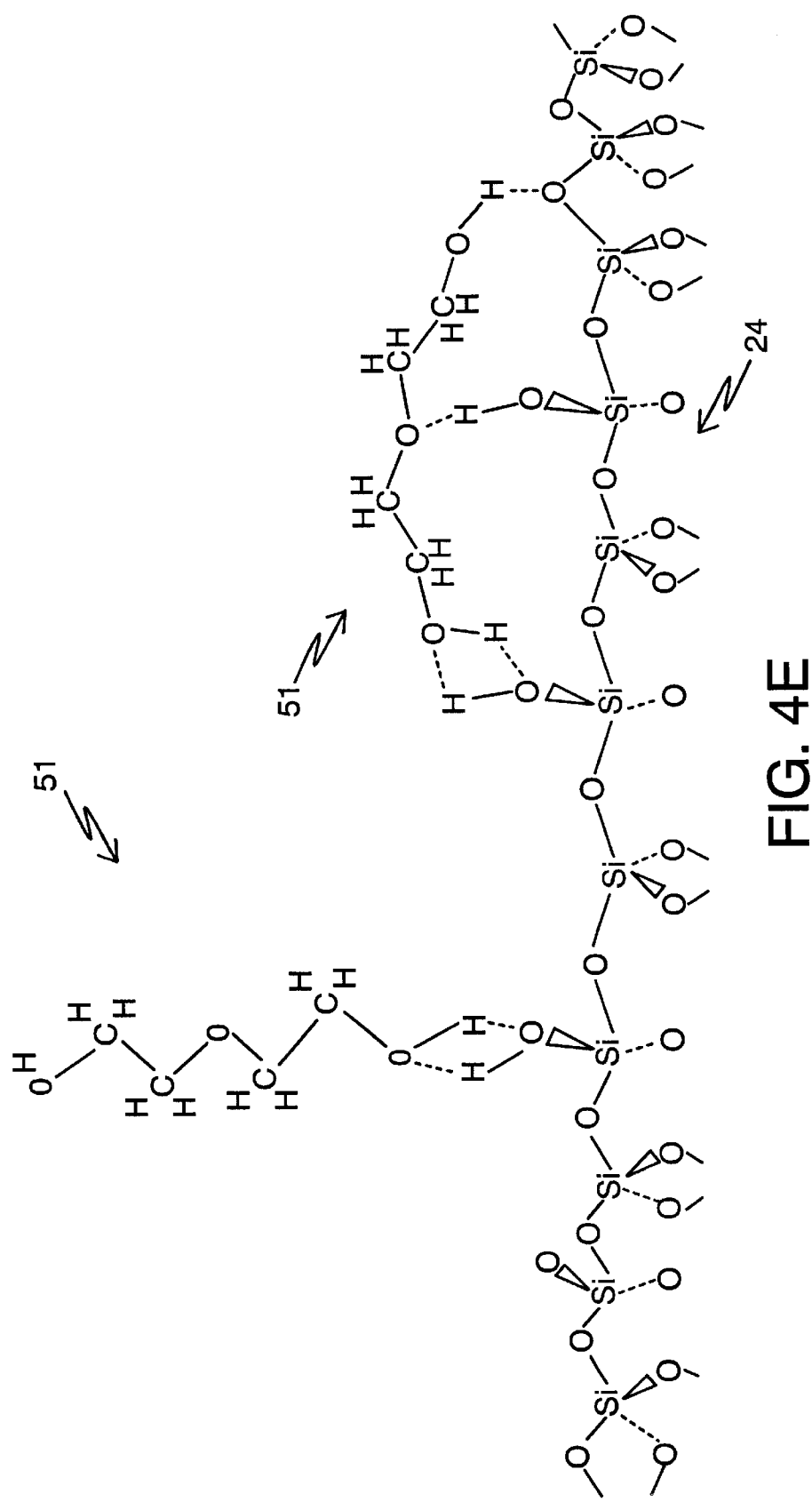
FIG. 4e is a drawing believed to show the bonding configuration between a DEG molecule and the silica surface.

Slurry 6a and slurry 6b have been formulated using di(ethylene glycol), a low molecular weight compound with a designated abbreviation of DEG, having the molecular structure $(HOCH_2CH_2)_2O$. FIG. 4e illustrates what is believed to be the bonding configuration between the DEG molecule 51 and the silica surface 24.

The tested slurry formulations are as follows:

Slurry 6c:
  Cabot SC113
  1,2,4-triazole (1.54 wt %)
  GEO-1000 (0.10 wt %)
  $H_2O$ (4.35 wt %)

Slurry 6d:
  Cabot SC113
  1,2,4-triazole (1.54 wt %)
  GEO-1000 (1.00 wt %)
  $H_2O$ (4.31 wt %)

Slurry 6a:
  Cabot SC113
  1,2,4-triazole (1.54 wt %)
  DEG (0.10 wt %)
  $H_2O$ (4.35 wt %)

Slurry 6b:
  Cabot SC113
  1,2,4-triazole (1.54 wt %)
  DEG (1.00 wt %)
  $H_2O$ (4.31 wt %)

The pH of each of these slurries is 8.9±0.1 All of the above compositions result in colloidal suspensions which are stable with respect to silica size distribution over greater than two months time.

Using a standardized Cu Damascene process, all of the above slurries have been evaluated for 1) their polishing rates of unpatterned Cu, Ta, and $SiO_2$ films, 2) the degree of Cu line dishing and Cu pattern erosion that results when used as a second step Ta polish, and 3) the tendency of the slurry to produce precipitate residues on Cu features. The results are summarized in Table 1.

Wafers polished with slurries 6a, 6b, and 6d exhibit a moderate degree of silica precipitate and stain, although less than present on the control. However, the wafer polished with slurry 6c shows little improvement in the degree of precipitation when compared to the control.

4. Dimethylsiloxane-Ethylene Oxide Co-Polymer

Figure 4F:
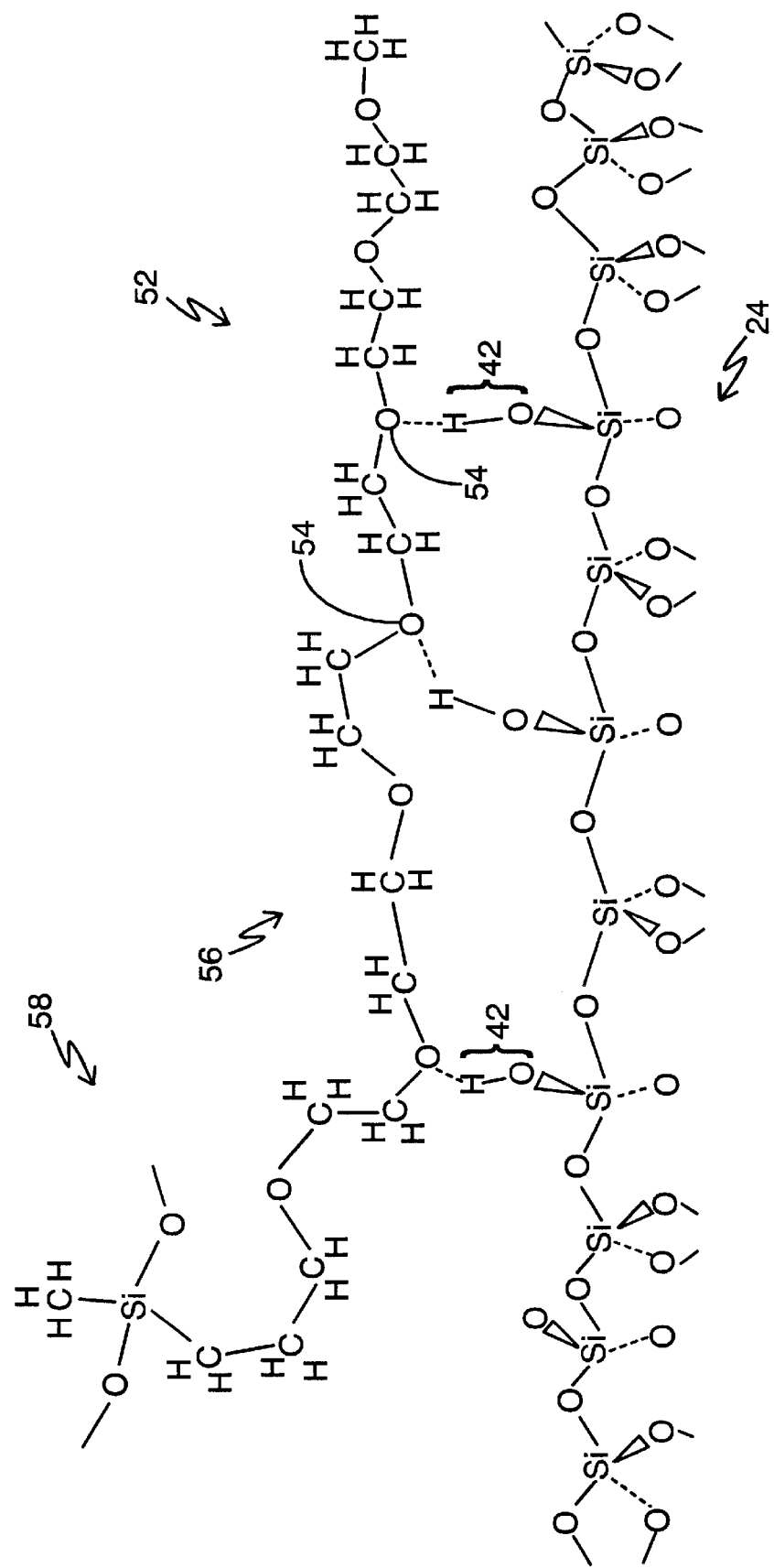
FIG. 4f is a drawing believed to show the bonding configuration between a DMSiO—EO molecule and the silica surface.

The abbreviation for this compound is designated as DMSiO—EO. Its chemical structure is $(CH_3)_3SiO\{SiO(CH_3)[CH_2CH_2CH_2(OCH_2CH_2)_xOCH_3]\}_m\{SiO(CH_3)_2\}_nSi(CH_3)_3$. Its molecular weight is in the range between 600 and 1000. FIG. 4f illustrates what is believed to be the bonding configuration between the DMSiO—EO molecule 52 and the silica surface 24. The DMSiO—EO molecules hydrogen bond to silica through ether oxygens 54 to silanol sites 42 on silica surface 24. DMSiO—EO is a classic surfactant molecule. 75% of the molecule's mass is comprised of polyethylene oxide branches 56 which are hydrophilic, i.e., which readily react with or dissolve in water. The remaining 25% of the molecule's mass is comprised of silicone tail 58 which is hydrophobic, i.e., which is not capable of reacting with or dissolving in water. As a result of these two components of the molecule, the complete DMSiO—EO molecule will mix with water, but will readily coat onto an available surface such as the silica surface. These surfactant characteristics of DMSiO—EO lead to a much greater adsorption onto polymeric silica and solid silica surfaces than occurs for other hydrogen bonding molecules that are not surface-active. Consequently, beneficial effects are expected at reduced DMSiO—EO concentration levels.

Two different Ta slurry formulations containing DMSiO—EO have been tested.

The tested slurry formulations are as follows:

Slurry 3a:
  Cabot SC113
  1,2,4-triazole (1.54 wt %)
  DMSiO—EO (0.01 wt %)
  $H_2O$ (4.36 wt %)

Slurry 3b:
  Cabot SC113
  1,2,4-triazole (1.54 wt %)
  DMSiO—EO (0.10 wt %)
  $H_2O$ (4.35 wt %)

The pH of each of these slurries is 8.9±0.1 Each of the above compositions result in colloidal suspensions which are stable with respect to silica size distribution over greater than two months time.

Using a standardized Cu Damascene process, each of the above slurries has been evaluated for 1) its polishing rates of unpatterned Cu, Ta, and $SiO_2$ films, 2) the degree of Cu line dishing and Cu pattern erosion that results when used as a second step Ta polish, and 3) the tendency of the slurry to produce precipitate residues on Cu features. The results are summarized in Table 1. No silica precipitate or copper stain residues are discernable using visual and SEM inspections at any wafer locations for slurry 3b. The wafer polished with slurry 3a exhibits a very minor degree of localized silica precipitate, although much less than present on the wafers using the control slurry, and no copper staining. These results indicate that DMSiO—EO will be effective as a precipitate/residue inhibitor for concentrations of 0.01 wt % or greater.

The portion of the DMSiO—EO molecule which bonds to the silica surface is the EO (ethylene oxide) portion. Therefore, its bonding is equivalent to the aforementioned PEG or GEO molecules. It is seen that the surfactant DMSiO—EO yielded as good or better results at 0.01 wt % than were seen for the equivalent non-surfactant PEG and GEO molecules at 0.1 wt %. It is therefore concluded that use of surfactant additives can decrease the needed additive concentration for suppression of precipitates and residues.

DMSiO—EO is representative of a class of non-ionic surfactant compounds that can hydrogen bond with silica and/or copper and which therefore have the potential to suppress or prevent precipitate residues. Other such surfactants containing PolyEthylene Oxide (PEO) include:

octylphenol polyethylene oxide
nonylphenol polyethylene oxide
polyoxyethylene lauryl ether
polyoxyethylene cetyl ether.

There also exist perfluorinated analogs of these compounds. It is believed that these surfactants will act similarly to DMSiO—EO as precipitate/residue inhibitors.

5. Glycerol Propoxylate

This compound has been tested in a first form having an average molecular weight of 1500 and a second form having an average molecular weight of 260. The abbreviations for these compounds are designated as GPO-1500 and GPO-260 respectively. Their chemical structures are

Figure 4G:
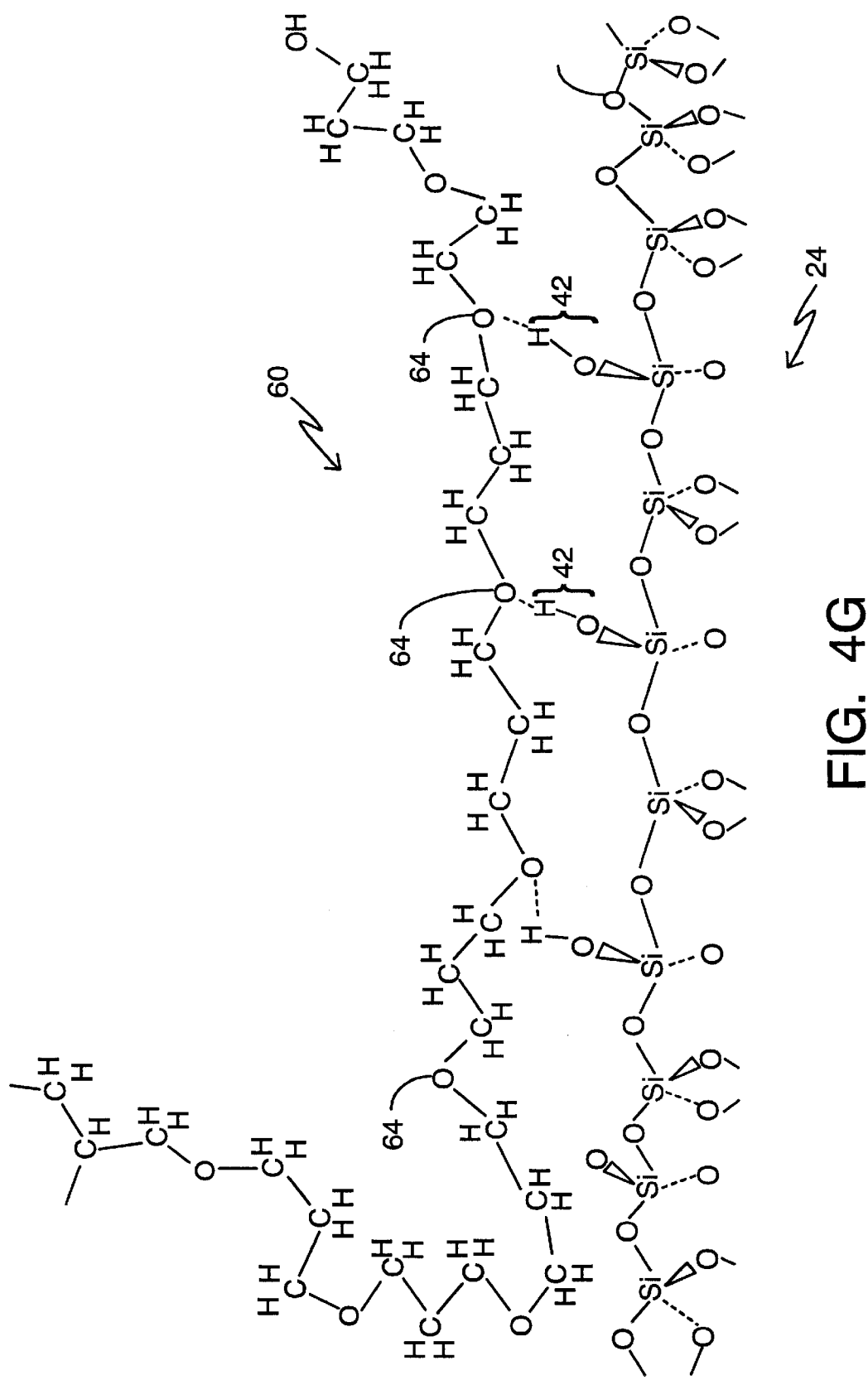
FIG. 4g is a drawing believed to show the bonding configuration between a GPO molecule and the silica surface.

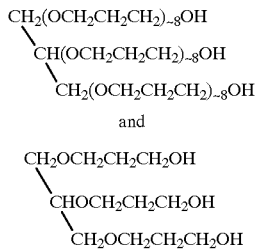

and respectively. FIG. 4g illustrates what is believed to be the bonding configuration between the GPO molecule 60 and the silica surface 24. The GPO molecules hydrogen bond to silica through ether oxygens 64 to silanol sites 42 on silica surface 24. Glycerol propoxylate is structurally analogous to the aforementioned ethylene glycol ether compound, glycerol ethoxylate. The additional carbon atom in each ether chain unit imparts a slightly greater hydrophobic character to the molecule than the ethylene glycol ethers.

Four different Ta barrier slurry formulations containing GPO-1500 and GPO-260 have been tested.

The tested slurry formulations are as follows:

Slurry 7b:
  Cabot SC113
  1,2,4-triazole (1.54 wt %)
  GPO-1500 (0.10 wt %)
  $H_2O$ (4.35 wt %)

Slurry 7d:
  Cabot SC113
  1,2,4-triazole (1.54 wt %)
  GPO-1500 (1.00 wt %)
  $H_2O$ (4.31 wt %)

Slurry 7a:
  Cabot SC113
  1,2,4-triazole (1.54 wt %)
  GPO-260 (0.10 wt %)
  $H_2O$ (4.35 wt %)

Slurry 7c:
  Cabot SC113
  1,2,4-triazole (1.54 wt %)
  GPO-260 (1.00 wt %)
  $H_2O$ (4.31 wt %)

The pH of each of these slurries is 8.9±0.1 All of the above compositions result in colloidal suspensions which are stable with respect to silica size distribution over greater than two months time.

Using a standardized Cu Damascene process, all of the above slurries have been evaluated for 1) their polishing rates of unpatterned Cu, Ta, and $SiO_2$ films, 2) the degree of Cu line dishing and Cu pattern erosion that results when used as a second step Ta polish, and 3) the tendency of the slurry to produce precipitate residues on Cu features. The results are summarized in Table 1. No silica precipitate or copper stain residues are discernable using visual and SEM inspection at any wafer locations for slurry 7d. The wafers polished with slurries 7a, 7b, and 7c exhibit a minor degree of silica precipitate and stain, although much less than present on the wafers using the control slurry. According to these results, it is believed that GPO will be effective as a precipitate/residue inhibitor for molecular weights of 260 or above, and for concentrations of 0.1 wt % or above.

Organic Amines

Another type of Ta barrier slurry additive shares three of the characteristics of the aforementioned hydrogen-bonding organic additives which are believed to inhibit residue and precipitate formation, namely:

1. The additive chemical species strongly adsorbs onto the surface of silica and/or copper hydroxide
2. The additive exhibits a high degree of surface coverage onto the reactive species, thereby occupying potential reaction sites
3. The additive adsorbant molecules are of a size to sterically hinder the collisions between two reactant molecules which result in new bond formation.

A category of chemical species which exhibits the above three characteristics comprises organic amines, which form strong electrostatic, rather than hydrogen, bonds to the surfaces of polymeric silica molecules and of copper (hydroxo) species. In basic solutions silica acquires a net negative charge, due to the neutralization of the weakly acidic silanol (Si—OH) groups present on the surface. In the mildly basic pH range (7<pH<10), many substituted organic amines and polymeric amines are positively charged in aqueous solution, due to protonation of the amine functional groups. These compounds are known to adsorb onto silica, forming strong electrostatic bonds.

Figure 4H:
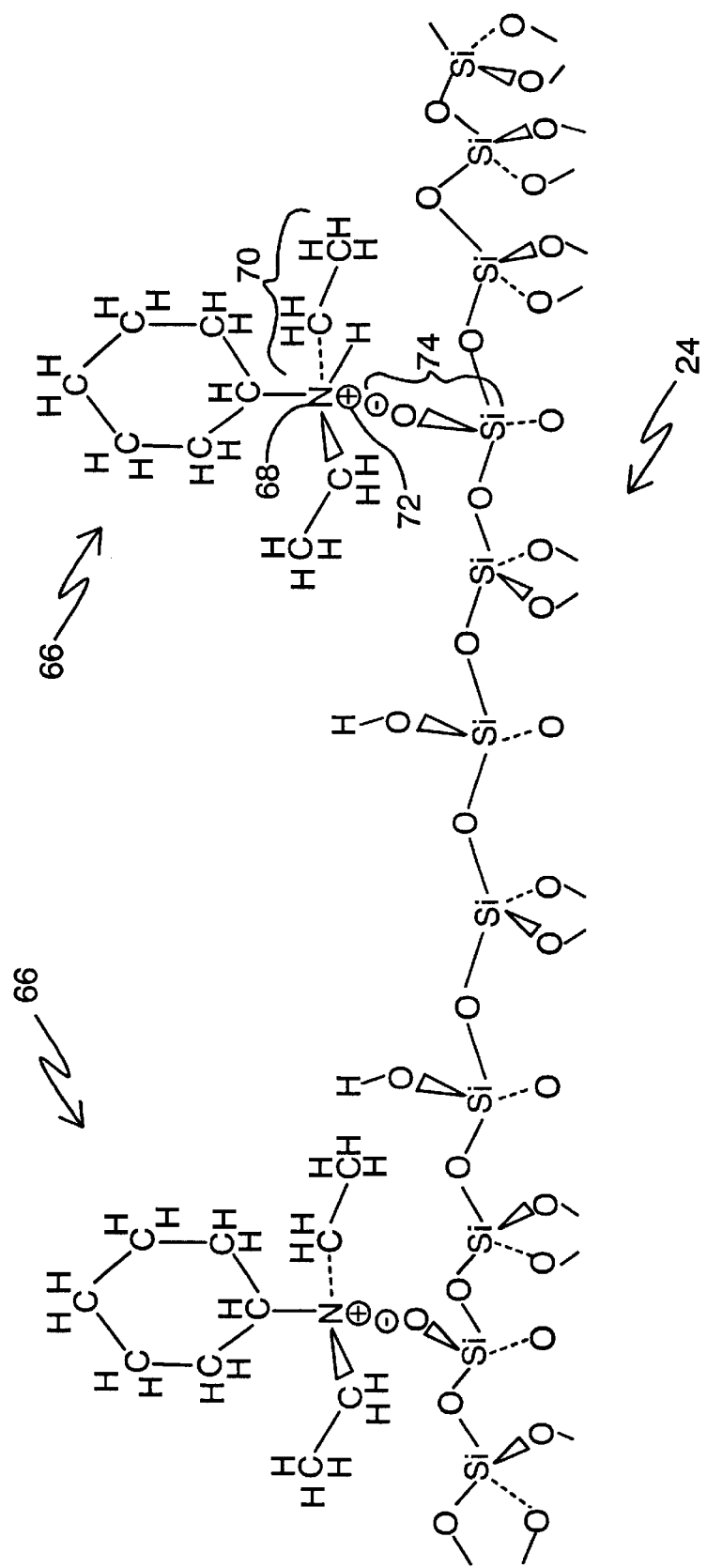
FIG. 4h is a drawing believed to show the bonding configuration between a DCA molecule and the silica surface.

A first organic amine compound known as N,N-diethylcyclohexylamine has been tested as a Ta barrier slurry additive. The abbreviation for this compound is designated as DCA. Its chemical structure is $C_6H_{11}N(C_2H_5)_2$. FIG. 4h illustrates what is believed to be the bonding configuration between the DCA molecule 66 and the silica surface 24. Lone pair electrons of nitrogen atoms 68 in amine functional groups 70 are bonded to $H^+$ 72, thereby causing the DCA atom to become a positively charged ion. Negatively charged SiO-74 on silica surface 24 provides an electrostatic bonding adsorption site for the DCA ion 66.

Two different Ta barrier slurry formulations containing DCA have been tested.

The tested slurry formulations are as follows:

Slurry 5a:
  Cabot SC113
  1,2,4-triazole (1.54 wt %)
  DCA (0.10 wt %)
  $H_2O$ (4.35 wt %)

Slurry 5b:
  Cabot SC113
  1,2,4-triazole (1.54 wt %)
  DCA (1.00 wt %)
  $H_2O$ (4.30 wt %)

The pH of each of these slurries is 8.9±0.1 The above compositions result in colloidal suspensions which are unstable with respect to silica size distribution over time. One day after preparation, both slurries exhibit moderate settling of large flocs on the bottom of the container.

Figure 4I:
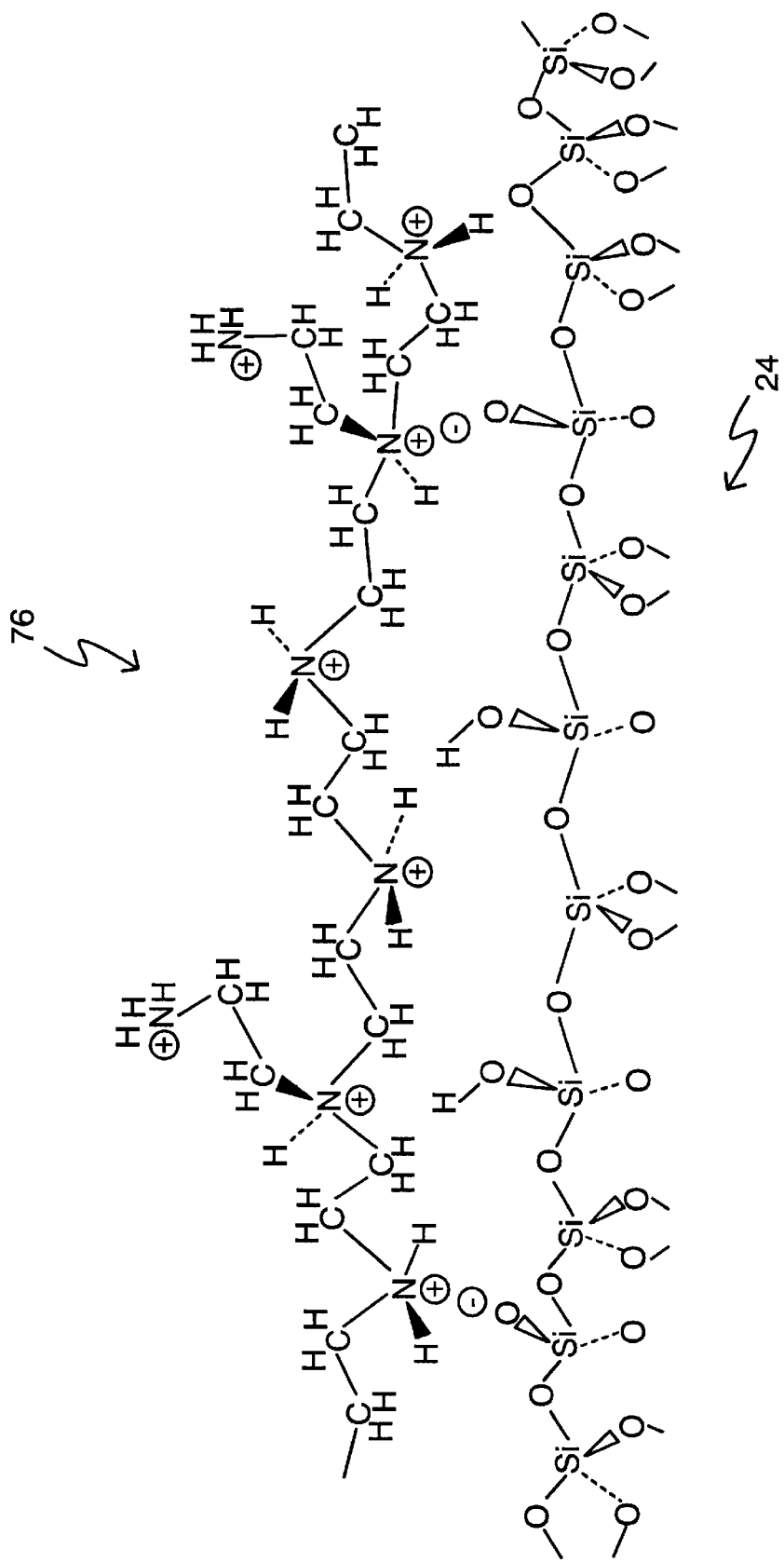
FIG. 4i is a drawing believed to show the bonding configuration between a PEI molecule and the silica surface.

A third Ta barrier slurry has been formulated using a related organic amine compound, polyethyleneimine, Mn 1800, a branched polymeric organic amine. The abbreviation for this compound is designated as PEI-1800. Its chemical structure is $[-NHCH_2CH_2-]_x[-N(CH_2CH_2NH_2)CH_2CH_2-]_y$. FIG. 4i illustrates what is believed to be the bonding configuration between the PEI-1800 molecule 76 and the silica surface 24.

The tested slurry formulation is as follows:

Slurry 5c:
Cabot SC113
1,2,4-triazole (1.54 wt %)
PEI-1800 (0.013 wt %)
$H_2O$ (4.37 wt %)

The pH of this slurry is app. 9. The above composition results in a colloidal suspension which is unstable with respect to silica size distribution over time. Seven days after preparation, the slurry exhibits a significant amount of settling of large flocs on the bottom of the container.

Using a standardized Cu Damascene process, all of the above slurries have been evaluated for 1) their polishing rates of unpatterned Cu, Ta, and $SiO_2$ films, 2) the degree of Cu line dishing and Cu pattern erosion that results when used as a second step Ta polish, and 3) the tendency of the slurry to produce precipitate residues on Cu features. The results are summarized in Table 1. The wafers polished with slurries 5a and 5c exhibit a moderate degree of silica precipitate and stain, although less than present on the wafers using the control slurry. The wafer polished with slurry 5b showed no improvement in the degree of precipitation when compared to the control.

According to these results, it is believed that, although the use of electrostatically bonding additives such as organic amines may act to inhibit silica precipitates, the electrostatic charge associated with such additives tends to destabilize the slurry and leads to settling.

Table 1 summarizes the results from all the aforementioned tested slurries. Included on the table are the slurry compositions, an indication of whether precipitate formation was seen, and an SEM microscope defect inspection summary. Polish rates of Cu, Ta, and oxide, as well as dishing, erosion, and Cu line protrusion, are not included in the table, since the values of each were acceptable for all the slurry formulations tested.

TABLE 1

Summary of additive results

| SLURRY CODE | ADDITIVES | PRECIPITATE? | VISUAL (MICROSCOPE) INSPECTION SUMMARY |
|---|---|---|---|
| Control | None | Y | Heavy silica precipitate and stain residues across the wafer |
| D | 0.1% PAA-1500 | Y | Moderate ppt/stain, less than with control slurry |
| E | 1.0% PAA-1500 | Y | Moderate ppt/stain, less than with control slurry |
| F | 0.11% PVA-18000 | N | No silica precipitate or copper stain residues |
| G | 0.55% PVA-18000 | N | No silica precipitate or copper stain residues |
| 1a | 0.22% PVA-18000 0.05% NaDBS | N | No silica precipitate or copper stain residues |
| 1b | 0.55% PVA-18000 0.13% NaDBS | N | No silica precipitate or copper stain residues |
| 2a | 0.1% PEG-200 | Y | Minor ppt/stain, much less than with control slurry |
| 2b | 0.1% PEG-1000 | Y | Minor ppt/stain, much less than with control slurry |
| 2c | 1.0% PEG-200 | Y | Moderate ppt/stain, less than with control slurry |
| 2d | 1.0% PEG-1000 | Y | Minor ppt/stain, much less than with control slurry |
| 3a | 0.01% DMSiO-EO | Y | Very minor ppt, much less than with control slurry |

TABLE 1-continued

Summary of additive results

| SLURRY CODE | ADDITIVES | PRECIPITATE? | VISUAL (MICROSCOPE) INSPECTION SUMMARY |
|---|---|---|---|
| 3b | 0.10% DMSiO-EO | N | No silica precipitate or copper stain residues |
| 4b | 1.0% sorbitol | Y | Moderate ppt/stain, less than with control slurry |
| 5a | 0.1% DCA | Y | Moderate ppt/stain, less than with control slurry |
| 5b | 1.0% DCA | Y | No ppt/stain improvement over control slurry |
| 5c | 0.013% PEI | Y | Moderate ppt/stain, less than with control slurry |
| 6a | 0.1% DEG | Y | Moderate ppt/stain, less than with control slurry |
| 6b | 1.0% DEG | Y | Moderate ppt/stain, less than with control slurry |
| 6c | 0.1% GEO-1000 | Y | Little ppt/stain improvement over control slurry |
| 6d | 1.0% GEO-1000 | Y | Moderate ppt/stain, less than with control slurry |
| 7a | 0.1% GPO-260 | Y | Minor ppt/stain, much less than with control slurry |
| 7b | 0.1% GPO-1500 | Y | Minor ppt/stain, much less than with control slurry |
| 7c | 1.0% GPO-260 | Y | Minor ppt/stain, much less than with control slurry |
| 7d | 1.0% GPO-1500 | N | No silica precipitate or copper stain residues |
| 11a | 0.1% PEG-10000 | (N) | No ppt/stain except for one site on one wafer |
| 11b | 1.0% PEG-10000 | N | No silica precipitate or copper stain residue |
| 12a | 0.1% PAA-10000 | Y | Moderate ppt/stain, less than with control slurry |
| 12b | 1.0% PAA-10000 | (N) | No silica precipitate or copper stain residue except for one site with very minimal ppt/stain |

It is seen that excellent precipitate/residue characteristics are achieved using slurries F, G. 1a, 1b, 3b, 7d, and 11b. Good results are achieved with slurries 3a, 11a and 12b. These best results correspond to all the slurries which include 0.11 to 0.55 wt % high molecular weight PVA-18000, the 0.01–0.10 wt % DMSIO-EO, the 1.0 wt % GPO-1500, the 0.1–1.0 wt % high molecular weight PEG-10000, and the 1.0 wt % high molecular weight PAA-10000. Comparison of the low-molecular weight PAA and PEG with their corresponding high-molecular weight additives clearly indicates a correlation between higher molecular weight and better residue and precipitate suppression. There are at least two possible mechanisms for the improved suppression at higher molecular weights. One likely mechanism is that the larger adsorbed additive molecules sterically hinder the collisions between the reactant slurry molecules. Another likely mechanism involves the probable kinetics of the polymer adsorption/desorption process onto silica. Higher molecular weight adsorbants having a larger number of bonding sites would tend to be more likely to remain adsorbed even if some of the hydrogen bonds were broken. The larger molecules would likely thereby have a lower frequency of desorption/adsorption and as a result more effectively suppress the reactions between slurry molecules. Similar arguments are believed to explain the relatively poor residue and precipitate suppression using GEO 1000, DEG and sorbital, all of which are lower in molecular weight than the additives which achieved the best results.

Comparison of lower concentrations of PAA-10000 and GPO-1500 with higher concentrations of these additives indicates a correlation between higher additive concentration and better residue and precipitate suppression. This is believed to be due to the need for high surface coverage of the reactive molecules by the additive adsorbates. This explanation is supported by the observation that the surfactant additive DMSiO—EO is effective at lower concentrations than the equivalent non-surfactant additives.

The addition to Ta slurries of certain organic chemical substances which form multiple hydrogen bonds with the surfaces of polymeric silica molecules and/or of copper (hydroxo) species has been shown to greatly suppress the formation of silica precipitates and copper stains. The elimination or substantial reduction of these defects in the copper metallization lines will result in improved reliability.

It is not intended that our invention be restricted to the exact embodiments described herein. Use of other chemical substances than those listed, but which share the properties of multiple hydrogen bonds with the surfaces of polymeric silica molecules and/or of copper(hydroxo) species may be used without altering the inventive concept. These additives may also be used in Ta barrier slurries for copper CMP which use other abrasives such as alumina in place of silica, since the presence of dissolved $SiO_2$ CMP byproducts in the slurry medium can also result in precipitates and copper staining. The scope of the invention should be construed in view of the claims.

With this in mind, we claim:

1. In a Chemical-Mechanical-Polishing (CMP) mixture present on the surface of an integrated circuit wafer while carrying out CMP on an integrated circuit copper metallization structure having a Ta barrier layer, said CMP mixture including, dissolved copper, dissolved tantalum, SiO2 particles;

silica precipitate material and copper staining material;

a slurry, said slurry including abrasive particles of silica suspended in an aqueous medium; and a copper corrosion inhibiting compound; the improvement comprising, said slurry including an organic additive selected from the group consisting of:

polyvinyl alcohol (PVA), PVA-poly(vinyl acetate) co-polymer, PVA-polyethylene co-polymer, sorbitol, glycerol, polyacrylamide (PAA), ethylene glycol, di(ethylene glycol), poly(ethylene glycol) (PEG), glycerol ethoxylate (GEO), dimethylsiloxane-ethylene oxide co-polymer (DMSiO- EO), polyethylene oxide surfactants, perfluorinated analogs of polyethylene oxide surfactants, glycerol propoxylate (GPO), octylphenol polyethylene oxide, nonylphenol polyethylene oxide, polyoxyethylene lauryl ether, polyoxyethylene cetyl ether, N,N-diethylcyclohexylamine (DCA), and polyethyleneimine(PEI);

said organic additive acting in said mixture to suppres chemical reactions between said silica, said copper, and said copper corrosion inhibiting compound, so that during siad CMP, the said silica precipitate material and the said copper staining material do not form visible residue on said integrated circuit.

2. A Chemical-Mechanical-Polishing (CMP) mixture present on the surface of an integrated circuit wafer while carrying out CMP on an integrated circuit copper metallization structure having a Ta barrier layer, said CMP mixture including, dissolved copper, dissolved tantalum, SiO2 particles;

silica precipitate material and copper staining material;

a slurry, said slurry including abrasive particles of silica suspended in an aqueous medium; and a copper corrosion inhibiting compound;

said slurry including an organic additive selected from the group consisting of:

polyvinyl alcohol (PVA), PVA-poly(vinyal acetate) co-polymer, PVA polyethylene co-polymer, sorbitol, glycerol, polyacrylamide (PAA), ethylene glycol, di(ethylene glycol), poly(ethylene glycol) (PEG), glycerol ethoxylate (GEO), dimethylsiloxane-ethylene oxide co-polymer (DMSiO—EO), polyethylene oxide surfactants, perfluorinated analogs of polyethylene oxide surfactants, glycerol propoxylate (GPO), octylphenol polyethylene oxide, nonylphenol polyethylene oxide, polyoxyethylene lauryl ether, polyoxyethylene cetyl ether, organic amines, N,N-diethylcyclohexylamine (DCA), and polyethyleneimine (PEI);

said organic additive acting in said mixture to suppress chemical reactions between said silica, said copper, and said copper corrosion inhibiting compound, so that during said CMP, the said silica precipitate material and the said copper staining material do not form visible residue on said integrated circuit.

3. The CMP slurry of claim 2, wherein said abrasive particles are silica.

4. The CMP slurry of claim 3, wherein said copper corrosion inhibiting compound is a triazole-containing compound.

5. The CMP slurry of claim 4, wherein said organic additive comprises polyvinyal alcohol (PVA).

6. The CMP slurry of claim 5, wherein said PVA is 98% hydrolyzed, and has an average molecular weight in the range between 10,000 and 186,000.

7. The CMP slurry of claim 6, wherein said PVA comprises at least 0.1 weight % of said slurry.

8. The CMP slurry of claim 7, wherein said PVA has an average molecular weight between 13,000 and 23,000, and said PVA comprises between 0.11 and 0.55 weight percent of said slurry.

9. The CMP slurry of claim 8, comprising:
Suspension A;
1.54 wt % 1,2,4-triazole;
0.11 wt % PVA-18000;
4.35 wt % $H_2O$;
the remainder of said slurry being suspension A aqueous silica suspension.

10. The CMP slurry of claim 8, comprising:
1.54 wt % 1,2,4-triazole;
0.55 wt % PVA-18000;
4.33 wt % $H_2O$;
the remainder of said slurry being Suspension A aqueous silica suspension.

11. The CMP slurry of claim 8, comprising:
1.54 wt % 1,2,4-triazole;
0.22 wt % PVA-18000;
4.34 wt % $H_2O$;
0.05 wt % sodium dodecylbenzenesulfonate
the remainder of said slurry being Suspension A aqueous silica suspension.

12. The CMP slurry of claim 8, comprising;
1.54 wt % 1,2,4-triazole;
0.55 wt % PVA-18000;
4.33 wt % $H_2O$;
0.13 wt % sodium dodecylbenzenesulfonate
the remainder of said slurry being Suspension A aqueous silica suspension.

13. The CMP slurry of claim 4, wherein said organic additive comprises sorbitol.

14. The CMP slurry of claim 13, comprising:
1.54 wt % 1,2,4-triazole;
1.00 wt % sorbitol;
4.31 wt % H$_2$O;
the remainder of said slurry being Suspension A aqueous silica suspension.

15. The CMP slurry of claim 4, wherein said organic additive comprises polacrylamide (PAA).

16. The CMP slurry of claim 15, wherein said PAA has an average molecular weight greater than or equal to 1500 and a concentration of at least 0.1 wt %.

17. The CMP slurry of claim 16, comprising:
1.54 wt % 1,2,4-triazole;
0.10 wt % PAA-10000;
4.45 wt % H$_2$O;
the remainder of said slurry being Suspension A aqueous silica suspension.

18. The CMP slurry of claim 16, comprising:
1.54 wt % 1,2,4-triazole;
1.00 wt % PAA-10000;
5.25 wt % H$_2$O;
the remainder of said slurry being Suspension A aqueous silica suspension.

19. The CMP slurry of claim 16, comprising:
1.54 wt % 1,2,4-triazole;
0.10 wt % PAA-1500
4.45 wt % H$_2$O;
the remainder of said slurry being Suspension A aqueous silica suspension.

20. The CMP slurry of claim 16, comprising:
1.54 wt % 1,2,4-triazole;
1.00 wt % PAA-1500;
5.25 wt % H$_2$O;
the remainder of said slurry being Suspension A aqueous silica suspension.

21. The CMP slurry of claim 4, wherein said organic additive comprises poly(ethylene glycol)(PEG).

22. The CMP slurry of claim 21, wherein said PEG has an average molecular weight greater than or equal to 200 and a concentration of at least 0.1 wt %.

23. The CMP slurry of claim 22, comprising:
1.54 wt % 1,2,4-triazole;
0.10 wt % PEG-10000;
4.35 wt % H$_2$O;
the remainder of said slurry being Suspension A aqueous silica suspension.

24. The CMP slurry of claim 22, comprising:
1.54 wt % 1,2,4-triazole;
1.00 wt % PEG-10000;
4.31 wt % H$_2$O;
the remainder of said slurry being Suspension A aqueous silica suspension.

25. The CMP slurry of claim 22, comprising:
1.54 wt % 1,2,4-triazole;
0.10 wt % PEG-1000;
4.35 wt % H$_2$O;
the remainder of said slurry being Suspension A aqueous silica suspension.

26. The CMP slurry of claim 22, comprising:
1.54 wt % 1,2,4-triazole;
1.00 wt % PEG-1000;
4.31 wt % H$_2$O;
the remainder of said slurry being Suspension A aqueous silica suspension.

27. The CMP slurry of claim 22, comprising:
1.54 wt % 1,2,4-triazole;
0.10 wt % PEG-200;
4.35 wt % H$_2$O;
the remainder of said slurry being Suspension A aqueous silica suspension.

28. The CMP slurry of claim 22, comprising:
1.54 wt % 1,2,4-triazole;
1.00 wt % PEG-200;
4.31 wt % H$_2$O; the remainder of said slurry being Suspension A aqueous silica suspension.

29. The CMP slurry of claim 4, wherein said organic additive comprises glycerol ethoxylate (GEO).

30. The CMP slurry of claim 29, comprising:
1.54 wt % 1,2,4-triazole;
0.10 wt % GEO-1000;
4.35 wt % H$_2$O;
the remainder of said slurry being Suspension A aqueous silica suspension.

31. The CMP slurry of claim 29, comprising:
1.54 wt % 1,2,4-triazole;
1.00 wt % GEO-1000;
4.31 wt % H$_2$O;
the remainder of said slurry being Suspension A aqueous silica suspension.

32. The CMP slurry of claim 4, wherein said organic additive comprises di(ethylene glycol) (DEG).

33. The CMP slurry of claim 32, comprising:
1.54 wt % 1,2,4-triazole;
0.10 wt % DEG;
4.35 wt % H$_2$O;
the remainder of said slurry being Suspension A aqueous silica suspension.

34. The CMP slurry of claim 32, comprising:
1.54 wt % 1,2,4-triazole;
1.00 wt % DEG;
4.31 wt % H$_2$O;
the remainder of said slurry being Suspension A aqueous silica suspension.

35. The CMP slurry of claim 4, wherein said organic additive comprises a non-ionic surfactant selected from the group consisting of: dimethylsiloxane-ethylene oxide co-polymer(DMSiO—EO), octylphenol polyethylene oxide, nonylphenol polyethylene oxide, polyoxyethylene lauryl ether, polyoxyethylene cetyl ether, and perfluorinated analogs of any of these.

36. The CMP slurry of claim 35, wherein said organic additive comprises dimethylsiloxane-ethylene oxide co-polymer (DMSiO—EO).

37. The CMP slurry of claim 36, wherein said DMSiO—EO has a concentration of at least 0.01 wt %.

38. The CMP slurry of claim 37, comprising:
1,54 wt % 1,2,4-triazole;
0.01 wt % DMSiO—EO;
4.36 wt % H$_2$O;
the remainder of said slurry being suspension A aqueous silica suspension.

39. The CMP slurry of claim 37, comprising:

1.54 wt % 1,2,4-triazole;
0.10 wt % DMSiO—EO;
4.35 wt % $H_2O$;

the remainder of said slurry being Suspension A aqueous silica suspension.

40. The CMP slurry of claim 4, wherein said organic additive comprises Glycerol Propoxylate (GPO).

41. The slurry of claim 40, wherein said GPO has an average molecular weight of at least 260 and a concentration of at least 0.01 wt %.

42. The CMP slurry of claim 41 comprising:

1.54 wt % 1,2,4-triazole;
0.10 wt % GPO-1500;
4.35 wt % $H_2O$;

the remainder of said slurry being Suspension A aqueous silica suspension.

43. The CMP slurry of claim 41 comprising:

1.54 wt % 1,2,4-triazole;
1.00 wt % GPO-1500;
4.31 wt % $H_2O$;

the remainder of said slurry being Suspension A aqueous silica suspension.

44. The CMP slurry of claim 41 comprising:

1.54 wt % 1,2,4-triazole;
0.10 wt % GPO-260;
4.35 wt % $H_2O$; the remainder of said slurry being Suspension A aqueous silica suspension.

45. The CMP slurry of claim 41 comprising:

1.54 wt % 1,2,4-triazole;
1.00 wt % GPO-260;
4.31 wt % $H_2O$; the remainder of said slurry being suspension A aqueous silica suspension.

46. The CMP slurry of claim 4, wherein said organic additive is an organic amine.

47. The CMP slurry of claim 46, wherein said organic addititve is N,N-diethylcyclohexylamine (DCA).

48. The CMP slurry of claim 47, comprising:

1.54 wt % 1,2,4-triazole;
0.10 wt % DCA;
4.35 wt % $H_2O$;

the remainder of said slurry being Suspension A aqueous silica suspension.

49. The CMP slurry of claim 47, comprising:

1.54 wt % 1,2,4-triazole;
1.00 wt % DCA;
4.30 wt % $H_2O$;

the remainder of said slurry being Suspension A aqueous silica suspension.

50. The CMP slurry of claim 46, wherein said organic additive is polyethyleneimine (PEI) having an average molecular weight of 1800.

51. The CMP slurry of claim 50, comprising:

1.54 wt % 1,2,4-triazole;
0.013 wt % PEI-1800;
4.37 wt % $H_2O$;

the remainder of said slurry being Suspension A aqueous silica suspension.

* * * * *